Figure 1:
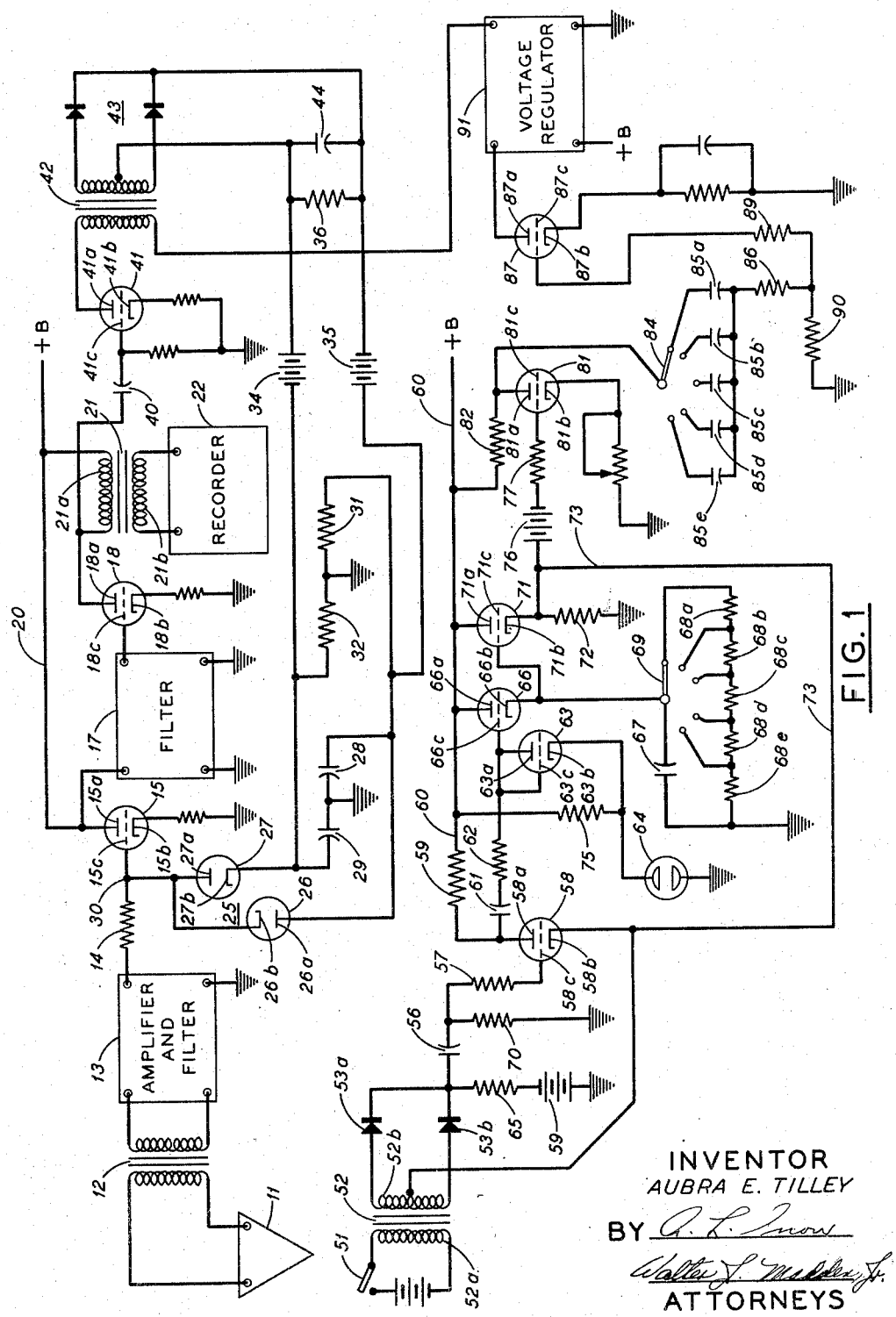

Feb. 18, 1958  A. E. TILLEY  2,824,179
APPARATUS FOR AMPLIFYING SEISMIC SIGNALS
Filed June 16, 1954  2 Sheets-Sheet 1

INVENTOR
AUBRA E. TILLEY
BY
ATTORNEYS

Feb. 18, 1958  A. E. TILLEY  2,824,179
APPARATUS FOR AMPLIFYING SEISMIC SIGNALS
Filed June 16, 1954  2 Sheets-Sheet 2

INVENTOR
AUBRA E. TILLEY
BY
ATTORNEYS

United States Patent Office 2,824,179
Patented Feb. 18, 1958

2,824,179

APPARATUS FOR AMPLIFYING SEISMIC SIGNALS

Aubra E. Tilley, Fullerton, Calif., assignor to California Research Corporation, San Francisco, Calif., a corporation of Delaware Application June 16, 1954, Serial No. 437,253

5 Claims. (Cl. 179—171)

This invention relates in general to seismic prospecting and, in particular, to methods and apparatus for amplifying and recording seismic detector signals.

In the art of seismic prospecting, the mechanical energy of seismic waves artificially generated in the ground is translated into electric impulses by means of a plurality of seismic wave detectors, and these impulses are amplified and recorded in some manner for analysis. Since the magnitude of the impulses generated by the detectors varies over a very substantial range during the period in which the seismic waves are detectable, some type of control of the gain with which the impulses are amplified is required to obtain amplified impulses having maximum limits lying within the limits of the amplifying means and of the recording means, and having minimum limits which will produce a legible record.

A number of methods have been proposed for effecting such control, such as the so-called pre-set gain or volume control systems, in which the gain of the amplifier is increased as a function of time. However, this method has disadvantages in that its effectiveness is sometimes impaired by the fact that the average amplitude of the impulses decreases as a function of time different from the function of time according to which the amplification has been set to increase.

In an additional method, the so-called automatic gain or volume control systems, the amplifier gain is varied as a function of the intensity or amplitude of the electrical impulses generated by the detectors. The automatic control systems, while being more desirable than the preset gain control systems, have the disadvantage that variations in the output thereof necessarily lag the variations in signal intensity. In an extreme case, this lag may result in the virtual suppression of a portion of a signal, such as in the case of a seismic signal in which a very weak reflection substantially immediately follows a very strong reflection. In such a case, the automatic control system, responding to the strong reflection, acts to reduce the gain of the amplifier, and the lag in recovery of the volume control is such that the subsequent immediately-following weak reflection arrives at the amplifier at a time when the gain thereof is insufficient to produce a recognizable output signal, resulting in a loss of potentially valuable information on the record. This undesirable suppression can be reduced to some extent by decreasing the time constant of the automatic volume control system to decrease its response time, but such action has the disadvantage of increasing the amplitude distortion introduced.

Broadly, the present invention contemplates methods and apparatus for amplifying a seismic detector signal in which a pulse is generated upon initiation of the explosion which produces the source of seismic waves being detected, and in which this generated pulse is utilized to disable or render inoperative the automatic gain-controlling means for a predetermined portion of the seismic detector signal. The generated pulse preferably has a steep wave front at its beginning, and means are provided for adjusting the shape of the pulse to permit the pulse to become effective in rendering the gain controlling means inoperative at any predetermined time during occurrence of the seismic signal.

It is therefore an object of the present invention to provide improved methods and apparatus for amplifying seismic detector signals.

It is an additional object of this invention to provide a method for amplifying a seismic detector signal having a portion of relatively large amplitude substantially immediately followed by a portion of relatively small amplitude, in which method an electrical pulse of adjustable amplitude is generated upon initiation of the explosion which produces the seismic waves and in which the generated pulse is utilized to render inoperative the automatic gain controlling means for a predetermined period of time during occurrence of the signal.

It is a further object of this invention to provide a method for controlling the operation of an amplifying system for seismic signals having automatic gain control means in the form of a variable attenuation device connected to the amplifying means, in which method a pulse generated simultaneously with the initiation of the explosion producing the seismic energy is utilized to render the automatic gain controlling means inoperative for a predetermined portion or portions of the seismic signal.

It is an additional object of this invention to provide apparatus for amplifying a seismic detector signal in which the gain of an amplifier is controlled by a network having an impedance variable with variations in the magnitude of the amplified signal and in which the network is rendered inoperative to control the amplification of the signal during a predetermined portion or portions of the signal.

Figure 2:
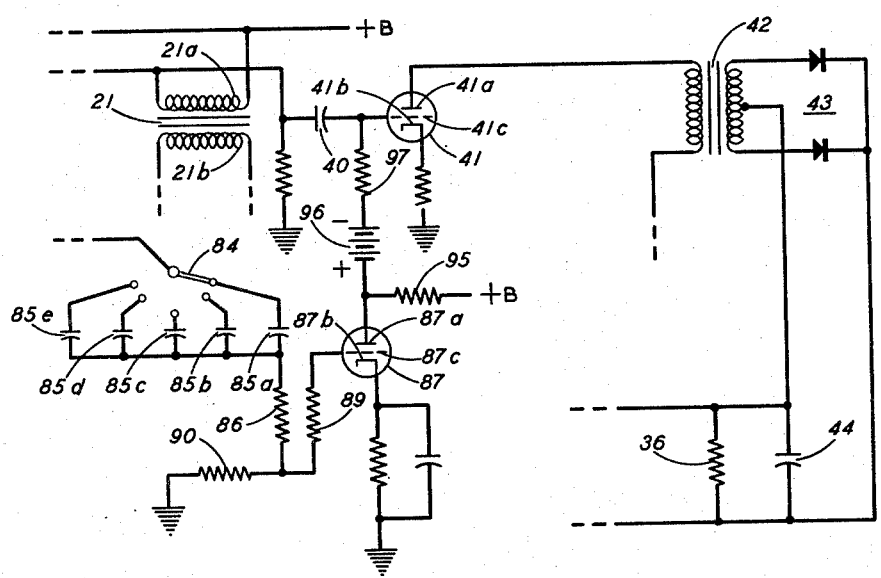
Figure 3:
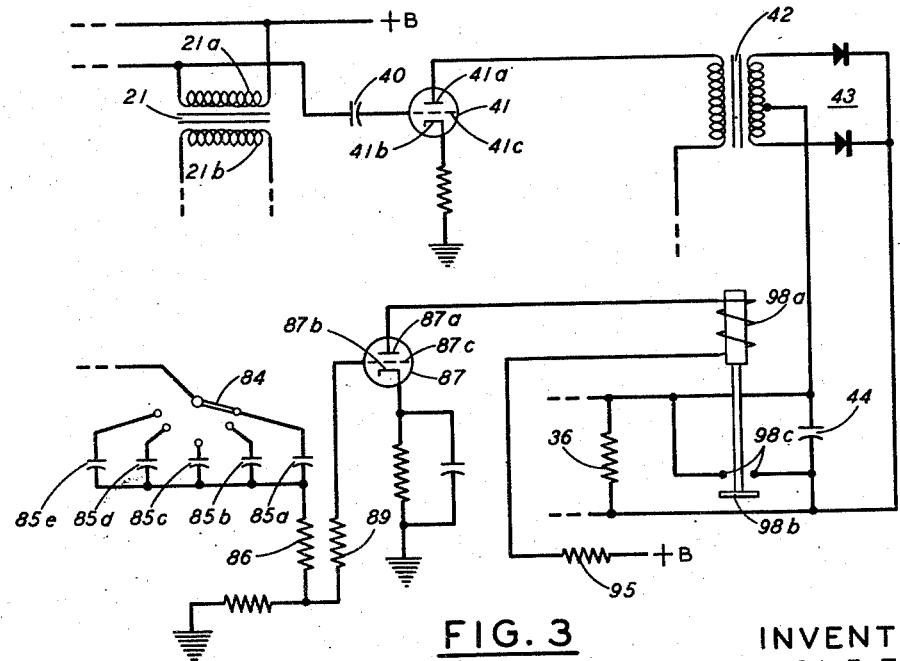

Objects and advantages other than those described above will be readily apparent from the following detailed description when read in connection with the accompanying drawing, in which:

Fig. 1 schematically illustrates a seismograph system including seismic detector signal amplifying means characterized by features of the present invention, and Figs. 2 and 3 illustrate portions of alternate embodiments of this invention.

Referring to Fig. 1 by character of reference, numeral 11 designates a seismic detector which converts the generated seismic waves to electrical signals varying in sympathy with the variations in the seismic waves. Detector 11 is connected through a transformer 12 to a seismic signal amplifier channel including an amplifier 13. The output of amplifier 13 is connected through a resistor 14 to the control grid 15c of a vacuum tube 15. The output of tube 15 is connected to a filter network 17, the output of which is in turn connected to the grid 18c of a vacuum tube 18. The output of tube 18 is connected to the primary winding 21a of a transformer 21 having a secondary winding 21b connected to suitable recording means 22 for producing an indication of the variations in the seismic detector signal. Anode 15a of tube 15 and one terminal of primary winding 21a are connected to a conductor 20 representing a source of plate voltage for tubes 15 and 18.

In general, the mode of operation of this system as thus far described is well understood by those skilled in the art. Briefly, seismic signals generated through detonation of an explosive charge at a point distant from detector 11 and as transmitted through the earth both directly and through reflection and refraction from varied strata interfaces and the like, are picked up by detector 11, converted into corresponding electrical signals, amplified through the amplifying stages 13, 15, and 18 and impressed through transformer 21 on recording means 22.

Since the ratio of the amplitude of the maximum seismic wave received by detector 11 and the amplitude of minimum seismic wave received thereby may be as high as 100,000 to 1, it is necessary to provide some type of automatic means for controlling the gain of the amplifying system to maintain the portions of the seismic detector signal of maximum amplitude within the limits of the amplifying and recording means, and to amplify the portions of the seismic detector signal of minimum amplitude with sufficient gain to produce a legible record on recorder 22.

One such type of automatic control which is especially suitable for this work includes a variable impedance network generally designated in Fig. 1 as 25. Network 25 comprises a pair of diodes 26, 27 having anodes 26a, 27a, respectively, and cathodes 26b, 27b, respectively. Cathode 26b and anode 27a are connected together to a terminal 30 between dropping resistor 14 and grid 15c. Anode 26a is connected through a capacitor 28 to a ground terminal, and cathode 27b is similarly connected through a capacitor 29 to ground. A pair of resistors 31 and 32 are connected across capacitors 28 and 29, respectively, to provide a discharge path for the capacitors aand to equalize the charges thereacross. A pair of biasing batteries 34 and 35 each have one terminal connected to opposite terminals of a resistor 36. The other terminal of battery 34 is connected to the junction of resistor 32, capacitor 29 and cathode 27b of tube 27. The other terminal of battery 35 is similarly connected to the junction of resistor 31, capacitor 28 and anode 26a of tube 26. Batteries 34 and 35 are so poled as to oppose the flow of current through diodes 26 and 27.

As will be understood by those skilled in the art, diodes 26 and 27 have impedances which vary as a function of the magnitude of the current flow therethrough, and hence as a function of the voltages impressed thereacross. Thus, with batteries 34, 35 poled so as to prevent current flow through diodes 26, 27, these diodes present a path of very high impedance in parallel with the input circuit of amplifier 15; more particularly, between terminal 30 and the grounded common terminal of the capacitors 28, 29. By suitable choice of the biasing batteries 34, 35, substantially any desired threshold may be established which must be exceeded by a biasing voltage of opposite polarity before any substantial current flow through diodes 26, 27 occurs to lower the shunt impedance of network 25.

To control the impedance of network 25 as a function of the amplitude of the seismic detector signal, a measure of the amplitude of the seismic detector signal as developed across primary winding 21a of transformer 21 is impressed through a capacitor 40 on the grid 41c of a vacuum tube 41. The output of tube 41 is connected through a transformer 42 to a full wave rectifier 43 which develops across a capacitor 44 a voltage having a magnitude dependent upon the magnitude of the amplified seismic detector signal impressed on recorder 22.

As will be seen, capacitor 44 is connected in parallel with resistor 36, and owing to the polarities of rectifier 43 and batteries 34, 35, the voltage developed across capacitor 44 is of a polarity to oppose the voltage of batteries 34, 35. The voltage across capacitor 44 is of a polarity to produce current flow through diodes 26, 27, and when the voltage across this capacitor exceeds the voltage of biasing batteries 34 and 35, diodes 26, 27 are rendered conductive to decrease the impedance therethrough. The extent to which the impedances of the diodes 26, 27 are changed varies as a direct function of the magnitude of the current flow therethrough.

Thus, during a period when the signal amplitude is rising, current conduction through the diodes 26, 27 is progressively increased to effect a progressive decrease in the impedance of network 25, and hence the shunting impedance between terminal 30 and ground. Conversely, during a period of decreasing signal amplitude, current conduction through diodes 26, 27 is decreased to effect a corresponding increase in the impedance between terminal 30 and ground. The constants of the elements of network 25 are such that in the absence of a signal from the geophone, the gain of tube 15 is at a maximum value.

The effect of such variations in the impedance of network 25 is to vary the portion of the output voltage of amplifier 13 which is impressed on the input of amplifier 15. A decrease in the impedance of network 25 increases the current therethrough and through resistor 14 to increase the voltage drop across resistor 14. An increase in the voltage drop across resistor 14 decreases the voltage between terminal 30 and ground to thereby decrease the input voltage to tube 15. Network 25 thus acts to vary the amplification of amplifier 15 inversely of variations in the amplitude of the seismic detector signal.

It will be apparent to those skilled in the art that the time constants of the circuits including capacitors 28, 29, and 44 will not be negligible, so that there will be some lag between variations in the amplitude of the signal in primary winding 21a and the corresponding variation in the impedance of network 25. This lag can be reduced to some extent by reducing the time constants of the various circuits, but such reduction has the disadvantage of increasing the amplitude distortion introduced by the automatic gain controlling circuits. Therefore, the actual time constants used are a compromise between that required for reasonable time of response and that necessitated by requirements for minimum amplitude distortion.

However, in some instances, the lag in the response of the automatic gain controlling equipment may be completely objectionable, such as in the case of a seismic detector signal having a portion of relatively large amplitude appearing subsequent to portions of relatively small amplitude and being substantially immediately followed by another portion of relatively small amplitude. In such an instance, the automatic gain-controlling means, responding to the portion of relatively large amplitude, reduces the gain of the amplifying means to such an extent that the amplifier gain is insufficient to produce a recognizable record from the substantially immediately following portion of relatively small amplitude.

To overcome this objection, I have modified the normal automatic gain-controlling equipment in the manner shown in Fig. 1 to vary the method of operation under predetermined circumstances. I provide means for generating a pulse of adjustable amplitude and length of duration and utilize this pulse for rendering the automatic gain control inoperative for a predetermined period or periods of time during occurrence of the seismic detector signal.

Reference numeral 51 diagrammatically represents a switch for closing a firing circuit to the explosive used to generate the detected seismic waves. The primary winding 52a of a transformer 52 is connected to switch 51 to generate a voltage in secondary winding 52b upon a change in current in primary winding 52a. A full-wave rectifier comprising a pair of half-wave rectifiers 53a, 53b is connected to the terminals of secondary winding 52b, and the common terminal of rectifiers 53a, 53b is connected through a capacitor 56 and a resistor 57 to the grid 58c of a vacuum tube 58 having an anode 58a and a cathode 58b. Anode 58a is connected through a resistor 59 to a conductor 60 representing the positive terminal of a source of plate voltage. The center tap of winding 52b is connected to cathode 58b, and rectifiers 53a, 53b are so poled that generation of a voltage in winding 52b impresses a negative potential between grid 58c and cathode 58b. A battery 59 and a resistor 65 are connected between ground and the common terminal of rectifiers 53a, 53b to bias grid 58c in such a manner as to prevent small impulses in the firing circuit from affecting tube 58 until the firing of the explosives. A grid leak resistor 70 is provided between ground and the common terminal of capacitor 56 and resistor 57.

The output of tube 58 is connected through a capacitor 61 and a resistor 62 to the commonly-connected grid 63c and anode 63a of a vacuum tube 63. Cathode 63b of tube 63 is connected to ground through a constant voltage device such as a neon lamp 64. The junction of cathode 63b and constant voltage device 64 is connected through a resistor 75 to conductor 60 to provide a source of voltage for tube 64. Anode 63a and grid 63c are connected to the grid 66c of another vacuum tube 66 having an anode 66a connected to conductor 60 and a cathode 66b. Cathode 66b is connected to ground by parallel paths through a capacitor 67 and through an adjustable resistor in the form of a bank of resistor segments 68a, 68b, 68c, 68d and 68e. A selector switch 69 is provided for selecting the portion of resistor 68 to be connected in parallel with capacitor 67 between cathode 66b and ground.

Cathode 66b is also connected to the grid 71c of a vacuum tube 71 having an anode 71a and a cathode 71b. Tube 71 is connected for cathode follower operation, with a resistor 72 connected between cathode 71b and ground. The junction between resistor 72 and cathode 71b is connected through a conductor 73 back to cathode 58b and the center tap of transformer winding 52b, for reason to be discussed below. Cathode 71b is also connected through a battery 76 and a resistor 77 to the grid 81c of a vacuum tube 81 having an anode 81a and a cathode 81b. Anode 81a is connected through a resistor 82 to the positive plate supply conductor 60. Anode 81a is also selectively connectable through a selector switch 84 to a terminal of any one of a bank of capacitors 85a, 85b, 85c, 85d, 85e. The common terminal of these capacitors is, in turn, connected through resistors 86 and 89 to the grid 87c of a tube 87. The output of tube 87 is impressed on a voltage regulator 91 which supplies a regulated plate voltage for tube 41 of the automatic volume control means.

The method of operation of the invention with the equipment illustrated in Fig. 1 is as follows. Upon closing of switch 51, corresponding to firing of the explosives to generate the seismic waves detected by detector 11, a pulse is generated in secondary winding 52b of transformer 52. Owing to the polarity of rectifiers 53a, 53b, this pulse is rectified and impressed upon grid 58c as a negative pulse. When grid 58c becomes more negative, conduction through tube 58 decreases to thereby increase the potential of anode 58a with respect to its value before such decrease in conduction occurred. This increase in potential of anode 58a is impressed as a positive pulse through capacitor 61 and resistor 62 to grid 66c of tube 66, thereby increasing the conduction through tube 66 to thus increase the potential across capacitor 67.

Capacitor 67 is effectively connected in parallel with constant voltage device 64, so that the voltage of capacitor 67 is compared with the substantially constant reference voltage appearing across tube 64, and the maximum value to which capacitor 67 may be charged is limited by the characteristics of tube 64. That is, since tube 64 and resistor 75 are connected in parallel with tube 66 and capacitor 67 between conductor 60 and ground, the constant voltage action of tube 64 effectively limits the maximum voltage to which capacitor 67 may be charged. The amplitude of the positive pulse impressed upon grid 66c from tube 58 upon firing and the values of capacitor 67 and diode 64 are such that the top portion of the pulse impressed on grid 66c is effectively clipped, so that the voltage across capacitor 67 rises abruptly and then is clipped by the limiting action of tube 64.

After the charging of capacitor 67 has been halted by the limiting action of tube 64, capacitor 67 commences discharging through the selected resistor element or elements of resistor bank 68, as determined by the position of switch 69. The rate at which capacitor 67 discharges, and hence the time required for the voltage of capacitor 67 to reach a given value, will be determined by the amount of resistance of resistor bank 68 connected in parallel with capacitor 67. Since grid 71c is connected to the junction of cathode 66b and the upper terminal of capacitor 67, the potential of grid 71c will vary in accordance with the potential of capacitor 67. These variations in the potential of grid 71c appear as corresponding variations in the potential of cathode 71b, owing to the connection of tube 71 as a cathode follower with resistor 72 connected in the cathode circuit thereof. The potential of the upper terminal of resistor 72, therefore, effectively follows variations in the potential of capacitor 67.

Since the upper terminal of resistor 72 is connected through conductor 73 to cathode 58b, an increase in the voltage drop across resistor 72 produces a corresponding increase in the potential of cathode 58b relative to grid 58c. The magnitude of this increase in potential is such as to render cathode 58b so positive that tube 58 is thereafter rendered substantially non-conductive. Thus, impulses appearing in the firing circuit subsequent to detonation of the explosive, such as those caused by shorting of the firing wires after the explosion, do not affect the operation of the system, since the tube 58 is effectively biased to cutoff.

Battery 76, connected between grid 81c and the junction between resistor 72 and cathode 71b, is of a polarity to oppose the voltage from resistor 72. Therefore, during the time the voltage across resistor 72 exceeds the voltage of battery 76, corresponding to the time when capacitor 67 is charged above a predetermined voltage, grid 81c is rendered positive with respect to cathode 81b, thereby rendering tube 81 conductive. As stated above, capacitor 67 commences to discharge exponentially through resistor bank 68, thereby exponentially decreasing the potential of the upper terminal of resistor 72. When the difference between the voltage across resistor 72 and the voltage of battery 76 is such as to render grid 81c negative, tube 81 is abruptly rendered non-conductive, thereby abruptly increasing the potential of anode 81a with respect to its potential when tube 91 was conducting.

An increase in the potential of anode 81a causes the selected capacitor or capacitors in capacitor bank 85 to be charged, and the rate at which the potential across the selected capacitor in capacitor bank 85 increases is determined by the time constant of the circuit comprising the selected capacitor or capacitors 85 and resistors 82, 86, and 90. The voltage across the selected capacitor thus increases to a maximum value at a rate determined by the time constant of this circuit.

The potential of grid 87c thus correspondingly increases in response to the increase in the voltage across the selected capacitor, producing a decrease in the potential of anode 87a. Anode 87a is connected to voltage regulator 91 in such a manner that the decrease in the potential of anode 87a results in a decrease to substantially zero of the output voltage of voltage regulator 91. Since voltage regulator 91 supplies the plate voltage for automatic gain control tube 41, disappearance of an output from regulator 91 renders tube 41 inoperative to thereby disable the automatic gain control for a predetermined time. Upon disappearance of plate voltage of tube 41, the output of this tube consequently decreases to substantially zero, thereby decreasing the voltage across capacitor 44 to substantially zero, and thus rendering diodes 26 and 27 of network 25 non-conductive, to produce substantially maximum gain in tube 15. With maximum gain in tube 15, the portion of the seismic signal occurring at this time is greatly amplified to produce a record in which this portion of the seismic signal is enlarged.

The length of time over which regulator 91 is rendered inoperative, and hence the time during which the automatic gain control is inoperative, is controlled by the rate of increase and decrease of the voltage across the selected capacitor in capacitor bank 85, which rate is in turn determined by the time constant of the circuits including the selected capacitor from capacitor bank 85 and resistors 82, 86, and 90.

After rising to a maximum value, the voltage across the selected capacitor in capacitor bank 85 decreases as the capacitor discharges through resistors 86 and 90, the rate of such discharge being determined by the time constants of the circuits. This decrease in voltage is transmitted to grid 87c to produce a consequent increase in the potential of anode 87a. When the potential of anode 87a has increased to a predetermined value, voltage regulator 91 is again rendered operative to supply a regulated plate voltage to tube 41, thus restoring the operation of the automatic gain control.

When this invention is utilized in amplifying a seismic signal having a portion of relatively small amplitude substantially immediately following a portion of relatively large amplitude, the time of rendering the automatic gain control inoperative is set to coincide with occurrence of substantially the end of the portion of relatively large amplitude so that the substantially immediately following portion of relatively small amplitude is amplified with a greatly increased gain. It will be understood that if the nature of the seismic detector signal is such that it is desirable to enlarge more than one portion thereof, this may be done through suitable adjustment of the pulse generating and control circuits.

Fig. 2 illustrates a portion of an alternate embodiment of the invention in which the automatic gain-controlling means is rendered inoperative through the grid bias circuit of tube 41 rather than through the voltage regulator for this tube, as in the embodiment of Fig. 1. In Fig. 2, tube 41 is responsive to the amplitude of the seismic detector signal to control the impedance of network 25, as before. Grid 87c of tube 87 is connected as before through resistors 86 and 89 to capacitor bank 85 to cause the potential of anode 87a to vary substantially as described above in connection with Fig. 1. Anode 87a is connected through a resistor 95 to the positive terminal of a source of plate voltage. The junction of anode 87a and resistor 95 is connected through a battery 96 and a resistor 97 to the junction of grid 41c and capacitor 40, and battery 96 is so poled as to oppose the voltage drop across tube 87. The magnitudes of the voltage of battery 96 and the voltage across tube 87 are selected so that these voltages normally cancel each other during normal operation of the circuit, resulting in substantially no effect on grid 41c of tube 41 during this time. However, when the potential of anode 87a is abruptly decreased, corresponding to the charging of the selected one of the capacitors in capacitor bank 85, the voltage across tube 87 decreases to substantially zero, with the result that the voltage of battery 96 substantially exceeds the voltage across tube 87. The polarity of battery 96 is such as to render the grid 41c of tube 41 more negative, thereby producing a decrease in the conductivity of tube 41. Battery 96 is preferably of such a size as to render tube 41 substantially non-conductive during this period, thereby producing amplification of the portion of the seismic signal occurring during this time with maximum gain.

After rising to a maximum value, the voltage across the selected capacitor in capacitor bank 85 decreases as the capacitor discharges through resistors 86 and 90, resulting in a decrease in the potential of grid 87c and an increase in the potential of anode 87a. When the potential of anode 87a has increased to a value such that the voltage drop across tube 87 substantially equals the potential of battery 96, tube 41 is again rendered conductive to control the impedance of network 25, thus restoring operation of the automatic gain control.

Fig. 3 illustrates an alternate embodiment of the invention in which network 25, rather than tube 41, is disabled or rendered inoperative for a predetermined period of time. In Fig. 3, suitable switching means such as an electromagnetic relay 98, having an energizing winding 98a and a bridging contact 98b, is provided to bridge a pair of contacts 98c connected across capacitor 44. Energizing winding 98a is connected in the anode circuit of tube 87 to be energized by the current flow therein.

During normal operation of the system, with tube 87 substantially non-conductive, the current flow through winding 98a is insufficient to maintain relay winding 98a energized, so that the relay 98 is in the position shown in Fig. 3, with contacts 98c open. In this condition, relay 98 has no effect on the operation of the amplifying system. However, when tube 87 is rendered substantially fully conductive by the pulse from the selected capacitor in capacitor bank 85, as described above in connection with the operation of the embodiments of Figs. 1 and 2, current flow in the anode circuit of tube 87 is abruptly increased, thereby energizing winding 98a to cause bridging arm 98b to close contacts 98c.

Closure of contacts 98c effectively short-circuits the output of rectifier 43 and the secondary winding of transformer 42, thus preventing capacitor 44 from being charged from these elements. In the absence of a charge on capacitor 44, the impedance of network 25 is at a maximum value to thereby increase the gain of tube 15 to substantially a maximum value during the period of time in which capacitor 44 is short-circuited. After the selected capacitor in capacitor bank 85 has discharged to a sufficient value, tube 87 is again rendered non-conductive to produce de-energization of winding 98a, to thereby return the operation of the automatic gain control to normal. Thus, the embodiment of Fig. 3 operates in a manner similar to that described above in connection with the embodiments of Figs. 1 and 2 to effectively disable or render inoperative the automatic gain control for a predetermined period of time to amplify the portion of the seismic detector signal occurring during this interval of time with substantially the maximum gain.

Although but a few embodiments of the present invention have been illustrated and described, it will be apparent to those skilled in the art that various changes and modifications may be made therein without departing from the spirit of the invention or the scope of the appended claims.

I claim:

1. Apparatus for controlling the amplification of an electrical signal which is generated by a seismic detector in response to the actuation of a source of seismic energy, comprising amplifying means connected to said detector for amplifying said signal, automatic gain control means comprising a variable impedance network connected to said amplifying means, means responsive to the amplitude of the output of said amplifying means for varying the impedance of said impedance network inversely of variations in the amplitude of the output of said amplifying means, means responsive to actuation of said source of seismic energy for producing a first electrical pulse, means for generating a reference voltage, means for comparing the amplitude of said first pulse with the amplitude of said reference voltage to produce a second electrical pulse of predeterminable duration when the amplitude of said first pulse attains a predetermined value, and means for impressing said second pulse on said automatic gain control means to increase the impedance of said impedance network to substantially a maximum value during occurrence of said second pulse whereby said electrical signal is amplified with substantially the full amplification of said amplifying means during occurrence of said second pulse.

2. Apparatus for controlling the amplification of a signal which is generated by a seismic detector in response to the actuation of a source of seismic energy, comprising amplifying means connected to said detector for amplifying said signal, automatic gain control means comprising a variable impedance network connected to said detector in parallel with said amplifying means, means responsive to the amplitude of the output of said amplifying means for varying the impedance of said impedance network inversely of variations in the amplitude of said amplifier output, means responsive to actuation to said source of seismic energy for producing a first electrical pulse, means for generating a reference voltage, means for comparing the amplitude of said first pulse with the amplitude of said reference voltage to produce a second electrical pulse of predetermined duration when the amplitude of said first pulse attains a predetermined value, and means for impressing said second pulse on said automatic gain control means to increase the impedance of said impedance network to substantially a maximum value, whereby said electrical signal is amplified with substantially full amplification of said amplifying means during occurrence of said second pulse.

3. Apparatus for controlling the amplification of an electrical signal which is generated by a seismic detector in response to the actuation of a source of seismic energy comprising first amplifying means connected to said detector for amplifying said signal, second amplifying means, a variable impedance network connected between said first amplifying means and said second amplifying means for controlling the portion of the output of said first amplifying means which is transmitted to said second amplifying means, a capacitor for controlling the impedance of said variable impedance network, amplitude responsive means connected to said second amplifying means for controlling the charging of said capacitor in response to variations in the output of said second amplifying means to maintain the amplitude of the output of said second amplifying means within predetermined limits, pulse generating means responsive to actuation of said source of seismic energy for producing a first electrical pulse having an amplitude varying with time, means for generating a reference voltage, means for comparing the amplitude of said first pulse with the amplitude of said reference voltage to produce a second electrical pulse of predetermined duration when the amplitude of said first pulse attains a predetermined value corresponding to a predetermined time after actuation of said source of seismic energy, and means for impressing said second pulse on said amplitude-responsive means to prevent said capacitor from charging, whereby the impedance of said network is increased to substantially a maximum value to amplify said signal with substantially full amplification during occurrence of said second pulse.

4. Apparatus for controlling the amplification of an electrical signal which is generated by a seismic detector in response to the actuation of a source of seismic energy comprising first amplifying means connected to said detector for amplifying said signal, second amplifying means, a variable impedance network connected between said first amplifying means and said second amplifying means for controlling the portion of the output of said first amplifying means which is transmitted to said second amplifying means, a capacitor for controlling the impedance of said variable impedance network, amplitude-responsive means including a thermionic valve connected to said second amplifying means for controlling the charging of said capacitor in response to variations in the output of said second amplifying means to maintain the amplitude of the output of said second amplifying means within predetermined limits, pulse generating means responsive to actuation of said source of seismic energy for producing a first electrical pulse having an amplitude varying with time, means for generating a reference voltage, means for comparing the amplitude of said first pulse with the amplitude of said reference voltage to produce a second electrical pulse of predetermined duration when the amplitude of said first pulse attains a predetermined value corresponding to a predetermined time after actuation of said source of seismic energy, and means for impressing said second pulse on said thermionic valve to prevent said capacitor from charging, whereby the impedance of said network is increased to substantially a maximum value to amplify said signal with substantially full amplification during occurrence of said second pulse.

5. Apparatus for controlling the amplification of an electrical signal which is generated by a seismic detector in response to the actuation of a source of seismic energy comprising first amplifying means connected to said detector for amplifying said signal, second amplifying means, a variable impedance network connected between said first amplifying means and said second amplifying means for controlling the portion of the output of said first amplifying means which is transmitted to said second amplifying means, a capacitor for controlling the impedance of said variable impedance network, amplitude-responsive means connected to said second amplifying means for controlling the charging of said capacitor in response to variations in the output of said second amplifying means to maintain the amplitude of the output of said second amplifying means within predetermined limits, pulse generating means responsive to actuation of said source of seismic energy for producing a first electrical pulse having an amplitude varying with time, means for generating a substantially constant reference voltage, means for comparing the amplitude of said first pulse with the amplitude of said reference voltage to produce a second electrical pulse of predetermined duration when the amplitude of said first pulse attains a predetermined value corresponding to a predetermined time after actuation of said source of seismic energy, and means for utilizing said second pulse to prevent said capacitor from charging, whereby the impedance of said network is increased to substantially a maximum value to amplify said signal with substantially full amplification during occurrence of said second pulse.

References Cited in the file of this patent

UNITED STATES PATENTS

| | | |
|---|---|---|
| 2,554,905 | Hawkins et al. | May 29, 1951 |
| 2,582,714 | Meier | Jan. 15, 1952 |
| 2,591,637 | Tilley | Apr. 1, 1952 |
| 2,656,422 | Loper | Oct. 20, 1953 |